No. 724,407. PATENTED MAR. 31, 1903.
R. B. FINCH.
NOSE GUARD FOR EYEGLASSES.
APPLICATION FILED JULY 24, 1902.

NO MODEL.

WITNESSES:
Otto E. Hoddick.
Dena Nelson.

INVENTOR.
Robt Brooks Finch.
BY
ATTORNEY.

UNITED STATES PATENT OFFICE.

ROBERT BROOKS FINCH, OF DENVER, COLORADO, ASSIGNOR OF ONE-HALF TO EDWIN T. JONES, OF DENVER, COLORADO.

NOSE-GUARD FOR EYEGLASSES.

SPECIFICATION forming part of Letters Patent No. 724,407, dated March 31, 1903.

Application filed July 24, 1902. Serial No. 116,772. (No model.)

*To all whom it may concern:*

Be it known that I, ROBERT BROOKS FINCH, a citizen of the United States of America, residing at Denver, in the county of Arapahoe and State of Colorado, have invented certain new and useful Improvements in Nose-Guards for Eyeglasses; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in nose-guards for eyeglasses, my object being to provide a guard capable of a great variety of adjustments, whereby the pupilary distance and other positions of the lenses may be regulated at will, thus obviating the necessity of constructing different patterns of nose-guards to meet the requirements of different individuals. This is accomplished by forming a loop or bend in the nose-guard adjacent the lens-holder or the extremity of the bridge, thus permitting almost unlimited adjustment for pupilary distance and allowing the lenses to be inset and offset and raised and lowered at will by the manipulation of the loop.

The term "inset" as here used means the adjustment of the loop, whereby the lens is brought nearer to the eye, while the term "offset" means the adjustment whereby the lens is removed farther from the eye. There is also the pantoscopic adjustment, whereby the inclination of the lenses may be regulated as desired.

The invention will now be described in detail, reference being made to the accompanying drawings, in which is illustrated an embodiment thereof.

Figure 1:
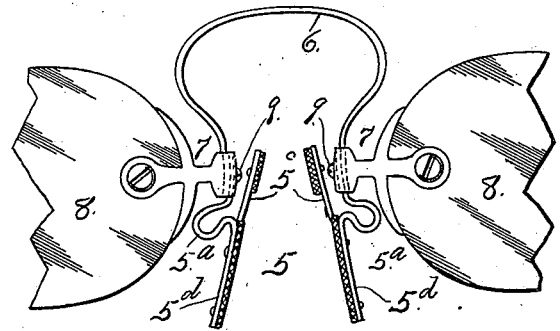
Figure 2:
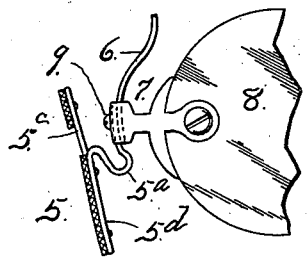
Figure 3:
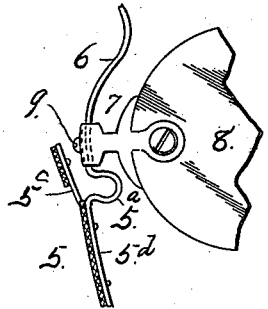
Figure 4:
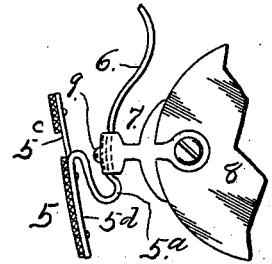
Figure 5:
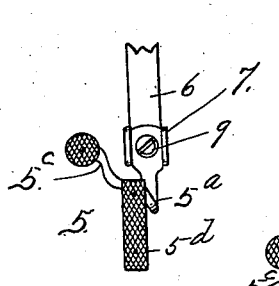
Figure 6:
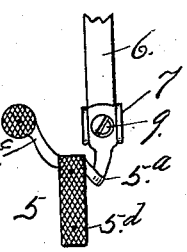
Figure 7:
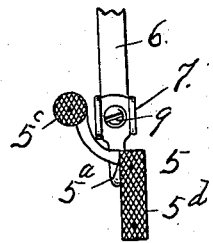
Figure 8:
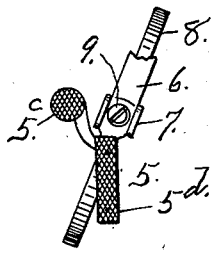

In the drawings, Figure 1 is a front view of a pair of eyeglasses equipped with my improved nose-guard, the loop of the guard constituting my improvement being in the normal position. Fig. 2 shows the guard with the loop adjusted to widen or increase the pupilary distance. Fig. 3 shows the loop bent to raise the lens. Fig. 4 is a similar view showing the loop bent to widen the pupilary distance and lower the lens. Fig. 5 is an inside view of the nose-guard, showing the loop bent to place the lens in a slightly-offset position. Fig. 6 is a similar view showing the loop bent to place the lens in an extreme offset position. Fig. 7 shows the lens slightly inset by bending the loop in a direction opposite that shown in Figs. 5 and 6. Fig. 8 shows the lens in a pantoscopic or reading position, resulting from bending the loop of the guard.

The same reference characters indicate the same parts in all the views.

Let the numeral 5 designate the nose-guard as a whole; 6, the spring-bridge; 7, the mounting to which the lens 8 is attached. The nose-guard and spring-bridge are attached to the mounting by a screw 9.

From an inspection of the drawings and from what has already been stated it will be understood that my improvement consists of the bend or loop $5^a$, formed in the guard. This guard, as shown in the drawings, consists of an arm $5^c$, having a bearing-tip engaging the upper part of the nose between the eyes of the wearer, and arm $5^d$ engaging the nose below the bearing-tip of the arm $5^c$, and the loop part or bent arm $5^a$, whose upper extremity is attached to the holder, as heretofore explained. This loop virtually forms an extension of the arm $5^d$, and by virtue of its peculiar shape permits the various adjustments shown in the drawings and heretofore explained. Hence it is believed that its advantages will be readily understood without further explanation in detail.

Having thus described my invention, what I claim is—

1. The combination with a lens-holder, of a nose-guard composed of distinct upper and lower nose-engaging parts, and a rigid vertical loop intermediate the two bearing parts and occupying a position at right angles to the plane of said bearing parts, the said loop being adapted to be bent to permit an inset or offset adjustment, a vertical and horizontal adjustment and also a pantoscopic adjustment of the lens.

2. The combination with a lens-holder, of a nose-guard composed of upper and lower separated parts occupying the same or approximately the same plane, and a rigid vertical loop projecting from the guard intermediate the bearing parts and occupying a plane at an angle to the plane of said parts, the said loop being adapted to be bent to permit a number of different adjustments, substantially as described.

3. The combination with a lens-holder, of a nose-guard composed of two distinct upper and lower nose-engaging parts lying in the same or approximately the same plane, and a rigid loop forming an extension of the lower part and extending at an angle to the plane of the nose-engaging parts, the said loop being connected with the lens-holder.

4. The combination with a lens-holder, of a nose-guard consisting of two parts, the upper part consisting of an arm projecting inwardly from the upper extremity of the lower part and terminating in a bearing-tip, the upper and lower nose-engaging parts lying substantially in the same plane, and a rigid vertical loop extending laterally from the upper extremity or the lower nose-engaging part and connected with the lens-holder, substantially as described.

5. The combination with a lens-holder, of a nose-guard consisting of upper and lower nose-engaging parts, and a rigid vertical loop extending at right angles to the plane of the nose-engaging parts and normally lying in the plane or approximately in the plane of the lens, substantially as described.

In testimony whereof I affix my signature in presence of two witnesses.

ROBERT BROOKS FINCH.

Witnesses:
 DENA NELSON,
 A. J. O'BRIEN.